Aug. 17, 1937.    R. A. BAUDRY ET AL    2,090,465
OIL RING FOR BEARING LUBRICATION
Filed Jan. 9, 1936
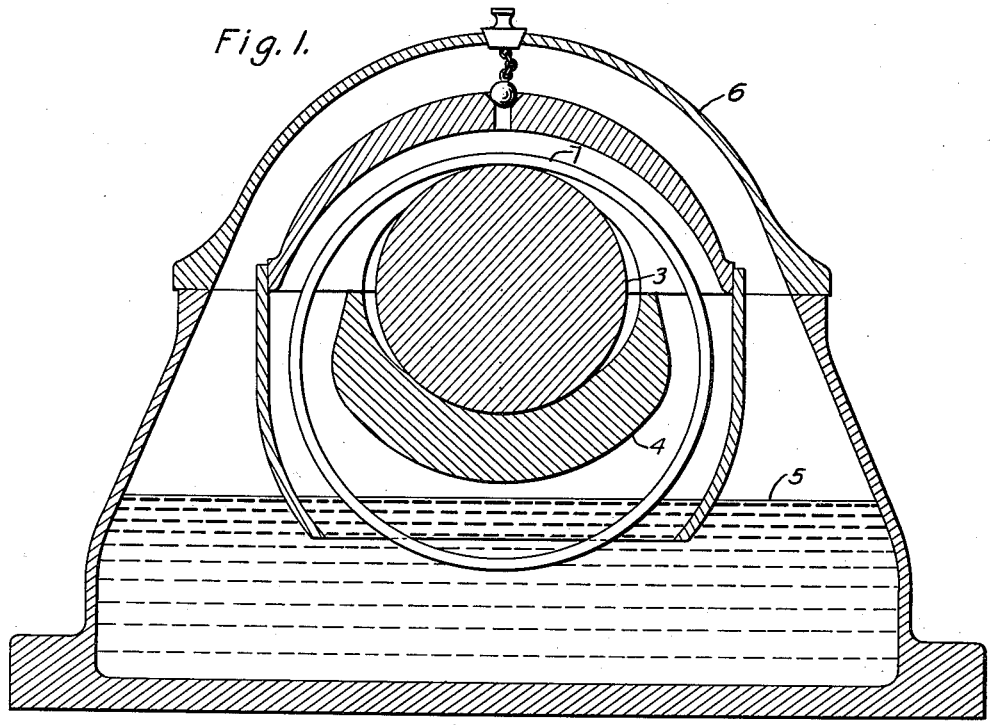
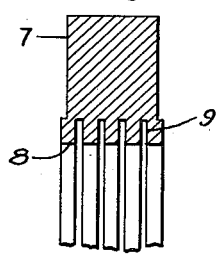
WITNESSES:
INVENTORS
René A. Baudry &
Leonid M. Tichvinsky
BY
ATTORNEY Patented Aug. 17, 1937

2,090,465

UNITED STATES PATENT OFFICE 2,090,465

OIL RING FOR BEARING LUBRICATION

René A. Baudry, Wilkinsburg, and Leonid M. Tichvinsky, Pittsburgh, Pa., assignors to Westinghouse Electric & Manufacturing Company, East Pittsburgh, Pa., a corporation of Pennsylvania Application January 9, 1936, Serial No. 58,302

1 Claim. (Cl. 308—129)

Our invention relates to oil rings especially adapted for carrying oil to journal bearings, and it has particular relation to means for increasing the oil-carrying capacity of the rings, particularly at the higher speeds of operation of the bearing.

Heretofore, the oil rings which have been utilized have usually been plain, that is, with a smooth inner bore, although, in some instances, the rings have been provided with a wide groove on the inner bore, leaving only two narrow strips of the ring-material to make contact with the journal or with the oil-film which is interposed between the ring and the journal. In either case, the operability of the ring has been limited to slow speeds, normally not exceeding 1800 feet per minute in a self-cooled bearing, or 4000 feet per minute in a water-cooled bearing, corresponding to speeds of 350 and 770 revolutions per minute respectively, for a 20-inch shaft. On high speeds the slippage between the oil ring and the journal increases to such an extent that the amount of oil supplied by the ring is insufficient for proper lubrication.

According to our invention, these limitations in oil-ring design and usage are in large measure overcome, permitting the delivery of from two to four times as much oil as was previously possible, particularly at the higher speeds. We have discovered that the oil delivery is not increased, but on the contrary, is decreased at all except the very lowest speeds, by the use of a large groove cut on the inside surface or bore of the ring, but if a very narrow groove is utilized, or a plurality of very narrow grooves, the oil delivery is enormously increased, as will be hereinafter explained in more detail.

An exemplary form of embodiment of our invention is shown by way of illustration in the drawing, wherein Figure 1 is a transverse longitudinal section through a journal bearing of the type to which our invention applies; and Fig. 2 is a cross-sectional view through the oil ring.

In the drawing our invention is shown as being applied to a journal bearing comprising a shaft or journal 3 and a bearing shell, of which the lower bearing brace 4 is shown in section. Oil is carried in an oil reservoir 5 disposed underneath the journal, said reservoir being located in the bottom of a bearing housing 6; and oil is delivered from the oil reservoir 5 to the journal by means of an oil ring 7 which constitutes the subject of our invention.

As shown in Fig. 2, the inner surface or bore 8 of the oil ring 7 is provided with a plurality of very narrow slots 9 extending circumferentially around the ring, and tests have shown that these slots materially increase the friction between the oil ring and the shaft, causing the oil ring to rotate faster and to deliver much more oil to the shaft.

We believe that our improved results may be explained by considering that the friction between the oil ring and the shaft is the same as for a journal bearing with a large clearance. We know that the coefficient of friction for such a bearing is given by the following formula:

$$f = ck\sqrt{\frac{zv}{w}}$$

where $c$ is a leakage factor depending upon the ratio between the length of the oil film in the direction of motion and the width of the bearing; $k$ is a coefficient depending upon the difference in radius between the bearing shell (or oil ring) and the shaft; $z$ is the absolute viscosity of the oil; $v$ is the relative velocity between the shaft and the bearing shell (or oil ring); and $w$ is the load per unit width of the bearing.

Our tests have shown, however, that the leakage factor $c$ increases considerably as the width of the bearing or oil ring is decreased, other things being equal, this result being accomplished by the sub-division of the ring into a plurality of narrow rings, in effect, by the use of the circumferential grooves 9. In previous designs of oil rings utilizing a single wide groove cut in the inner bore of the ring, the groove was so wide that the total width of the bearing-surface of the ring was quite small, thus resulting in a very large increase in the factor $w$ in the formula, or the load per unit width of the oil ring, thus tending to produce a decrease in the coefficient of friction between the oil ring and the shaft.

According to our invention, we use very narrow grooves, so that the effective frictional area of the ring is not very substantially reduced, and we subdivide the ring, in effect, into a number of separate narrow rings which are held together in spaced relation to each other. We have thus succeeded in increasing the coefficient $c$, which we have designated as the leakage factor, without suffering any material increase in the unit load $w$, and this result is obtained in a most economical and simple manner by the machining of small narrow grooves in the inside bore of the ring.

In our improved ring, the oil can escape from underneath the ring, where it rests on the shaft, by moving both axially along the shaft and also by moving circumferentially in the slots or grooves 9. This circumstance brings about a reduction in the thickness of the oil film or the clearance between the ring and the shaft at the point where the oil film is a minimum, that is, at about the top of the shaft. This decrease in the thickness of the oil film contributes materially to the increase in the friction between the oil ring and the shaft, causing the speed of rotation of the oil ring to more closely approach that of the shaft and increasing the amount of oil which is carried up from the oil reservoir 5 to the top of the shaft 3.

While the minimum thickness of the oil film, at about the top of the shaft, is decreased by reason of the presence of our narrow slots or grooves 9, the total quantity of oil which is delivered laterally of the ring, that is, what is technically known as the side leakage of oil, is increased by reason of the reduction in the effective width of the bearing surface of the ring, or the thickness of the ring-portions between the several slots or grooves 9. The amount of oil which is delivered to the journal 3 is a direct function of the speed of the ring 7, and the increase in the speed of the ring, which we achieve by our grooves 9, thus results in a greater supply of oil from the ring to the journal. Any provision of spaced narrow grooves which serves the purpose of increasing the side leakage of the oil will increase the speed of the oil ring and the amount of oil which is delivered to the journal.

While we have shown our grooves 9 as extending in a circumferential direction, it is to be understood that this was merely for convenience in machining or applying the grooves, and that any provision of spaced narrow grooves which accomplishes the result of increasing the side leakage without very substantially increasing the load per unit width of the oil ring will accomplish substantially the same purposes.

We claim as our invention:

An oil ring for a bearing, characterized by having a plurality of narrow circumferential grooves on its inside surface, the aggregate width of all of the grooves being less than the aggregate width of the ungrooved portion of the inside surface of the ring.

RENÉ A. BAUDRY.
LEONID M. TICHVINSKY.